US006044887A

United States Patent [19]

Orlandi et al.

[11] Patent Number: 6,044,887

[45] Date of Patent: Apr. 4, 2000

[54] LABELING DEVICE IN A LABELING MACHINE WITH CONTINUOUS INTRODUCTION OF A FILM CONTAINING LABELS IN REEL FORM

[75] Inventors: Ireneo Orlandi, Grazie Di Curtatone; Carlo Antonioli; Simone Salvarani, both of Mantova, all of Italy

[73] Assignee: Sasib Labelling Machinery S.p.A., Mantova MN, Italy

[21] Appl. No.: 09/035,532

[22] Filed: Mar. 5, 1998

[30] Foreign Application Priority Data

Mar. 18, 1997 [IT] Italy .................................. PR97A0016

[51] Int. Cl.[7] ...................................................... B32B 31/00

[52] U.S. Cl. ............................ 156/521; 156/256; 83/348

[58] Field of Search .................................... 156/521, 519, 156/517, 256; 83/348, 349, 346, 347, 509, 685; 492/46; 384/473, 476; 254/42

[56] References Cited

U.S. PATENT DOCUMENTS

| | | | |
|---|---|---|---|
| 2,782,853 | 2/1957 | Heffelfinger | 83/72 |
| 3,923,261 | 12/1975 | Isoard et al. | 242/571.6 |
| 4,244,251 | 1/1981 | Iwao et al. | 83/349 |
| 4,325,762 | 4/1982 | Burmeister et al. | 422/106 |
| 5,380,381 | 1/1995 | Otruba | 156/64 |
| 5,413,651 | 5/1995 | Otruba | 156/64 |
| 5,779,005 | 7/1998 | Jones, Jr. et al. | 184/6.18 |

FOREIGN PATENT DOCUMENTS 0716 023 6/1996 European Pat. Off. .

*Primary Examiner*—Richard Crispino
*Assistant Examiner*—Linda L. Gray
*Attorney, Agent, or Firm*—Darby & Darby

[57] ABSTRACT

A labeling device with continuous introduction of a film containing labels includes a cutting group having a blade located along a generatrix of a rotating roller and a counter blade, a gripping and transfer drum for gripping a transferring a label cut by the blade towards a glue applying device and subsequently onto a container, and a resilient support having a fork-shaped cross-section with two arms joined together in a portion which forms the point of rotation of the arm carrying the counterblade and a wedge actuated by an adjusting screw to press against and cause rotation of the arm carrying the counterblade. The gripping and transfer drum has buffer pads inserted onto dovetail supports which are fixed to the gripping and transfer drum by inserts having an inclined wall designed to form with another wall in the gripping and transfer drum a dovetail seat for retaining the pads.

4 Claims, 5 Drawing Sheets

LABELING DEVICE IN A LABELING MACHINE WITH CONTINUOUS INTRODUCTION OF A FILM CONTAINING LABELS IN REEL FORM

BACKGROUND OF THE INVENTION

The present invention relates to a labeling device in a labeling machine with the continuous introduction of a film containing labels in reel form.

In particular the device in question is used mainly for the application of labels obtained by cutting a thin film of polypropylene or PVC or plastic film in general on which the images and data forming the label are printed. However, it could also be used for a film of other material, for example of the paper type.

The labeling devices which use films containing labels comprise: a group unwinding the film supplied from the reel; a cutting group consisting of a vertical blade mounted on a roller rotating about a vertical axis and a fixed vertical counterblade; a drum for picking up and transferring the cut label towards a roller for spreading the glue in predetermined zones and subsequently onto the container. Both the roller carrying the blade and the pickup drum are provided with internal chambers inside which a vacuum is created, and the chambers communicate by means of a plurality of holes with the external surface of the roller or the drum so as to suck up and retain the labels during the stage of cutting and transfer onto the drum and so as to keep them on the drum itself. The transfer drum is provided with a plurality of buffer pads which project from the external surface of the drum itself and which have the function of causing the label to adhere to the roller spreading the hot glue only in the region of said buffer pads so as to spread the glue only in predetermined zones of the label, in general on the leading edge and the end edge of the label, said edges being superimposed so as to be joined together when wound around the container.

Cutting of the film which in some cases as a thickness of a few hundreths of a millimeter poses various problems due mainly to bending or deformation of the movable blade support and the fixed blade or counterblade support. In the devices of the known type, the deformation occurs mainly for two reasons: owing to non-uniform thermal expansion throughout the rotating roller; on account of the blade fixing systems which fix the blade to the external surface of the roller itself.

Another drawback is due to the fact that the distance of the blades with respect to the drum for picking up and transferring the cut label is considerable and this necessitates the use of special grippers for gripping the label, which are housed on the drum also provided with holes through which a suction effect is created, said suction effect being designed to retain the label along the whole of its transfer path. The considerable distance between counterblade and pickup drum often results in the inexact positioning of the label on the drum with consequent positioning of the layer of glue in the wrong position. Moreover, the label may be positioned in a crooked manner on the container, resulting in rejects. On account of the considerable space between the cutting point and the gripping point, the label remains free during a part of its path where it may become inclined and hence be positioned on the drum incorrectly. This drawback represents more of a problem in the case of short-length labels for small containers.

SUMMARY OF THE INVENTION

An object of the present invention is to overcome the drawbacks mentioned above so as to obtain perfect cutting of the label from the film and correct positioning of the label on the gripping and transfer drum.

A further object is to facilicate the operation of cleaning and replacement of the buffer pads mounted on the transfer drum.

These objects are all achieved by the labeling device in a labeling machine with the continuous introduction of a film containing labels in reel form, forming the subject of the present invention, which is characterized by the contents of the claims indicated below.

BRIEF DESCRIPTION OF THE DRAWINGS

Characteristic features and advantages will emerge more clearly from the following description of a preferred embodiment, illustrated, purely by way of a non-limiting example, in the accompanying illustrative plates, in which.

DESCRIPTION OF THE PREFERRED EMBODIMENTS

Figure 1:
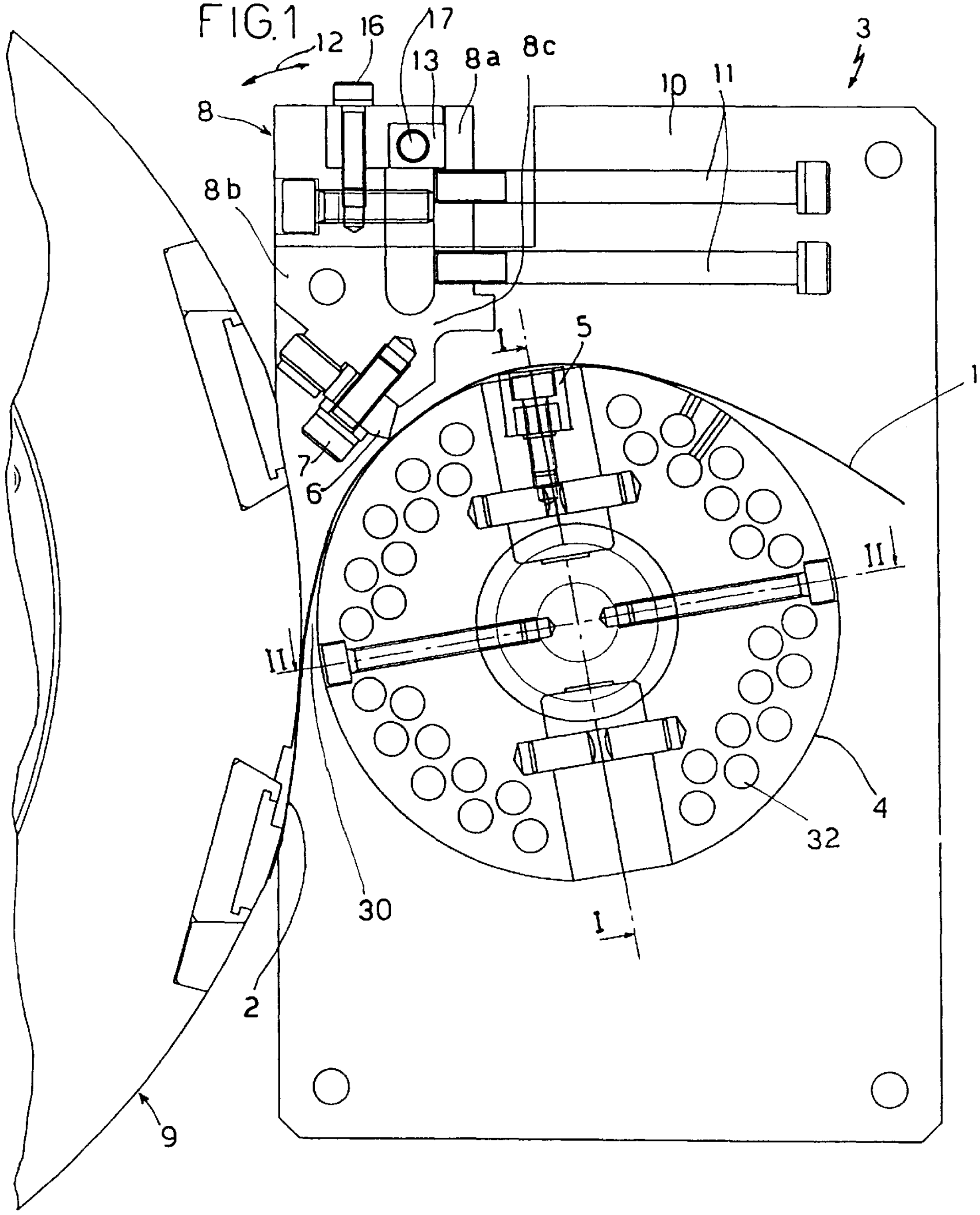
FIG. 1 shows a plan view of the device in its entirety.

With reference to FIG. 1, 1 denotes a film supplied from a reel (not shown) which is unwound by means of unwinding rollers of known type and also not illustrated. The film must be cut into sections of equal length so as to define a label 2, and, for this purpose, a cutting group denoted in its entirety by 3 is provided.

The cutting group 3 comprises a blade 5, which is mounted along a generatrix of a rotating roller 4, and a fixed counterblade 6, retained by a plurality of screws 7, on a resilient support denoted in its entirety by 8. 9 denotes a drum for gripping and transferring a label 2 cut from the film 1.

The resilient support 8 of the counterblade 6 has a fork-shaped cross-section with two arms **8*a* and 8*b* joined by a portion 8*c*** which allows resilient rotation of one arm with respect to the other one.

More precisely the arm **8*a* is rigidly locked to the frame 10 of the device by means of socket-head screws 11, while the arm 8*b* is free to bend in the direction of the arrows 12, rotating about the portion 8*c***.

Figure 4:
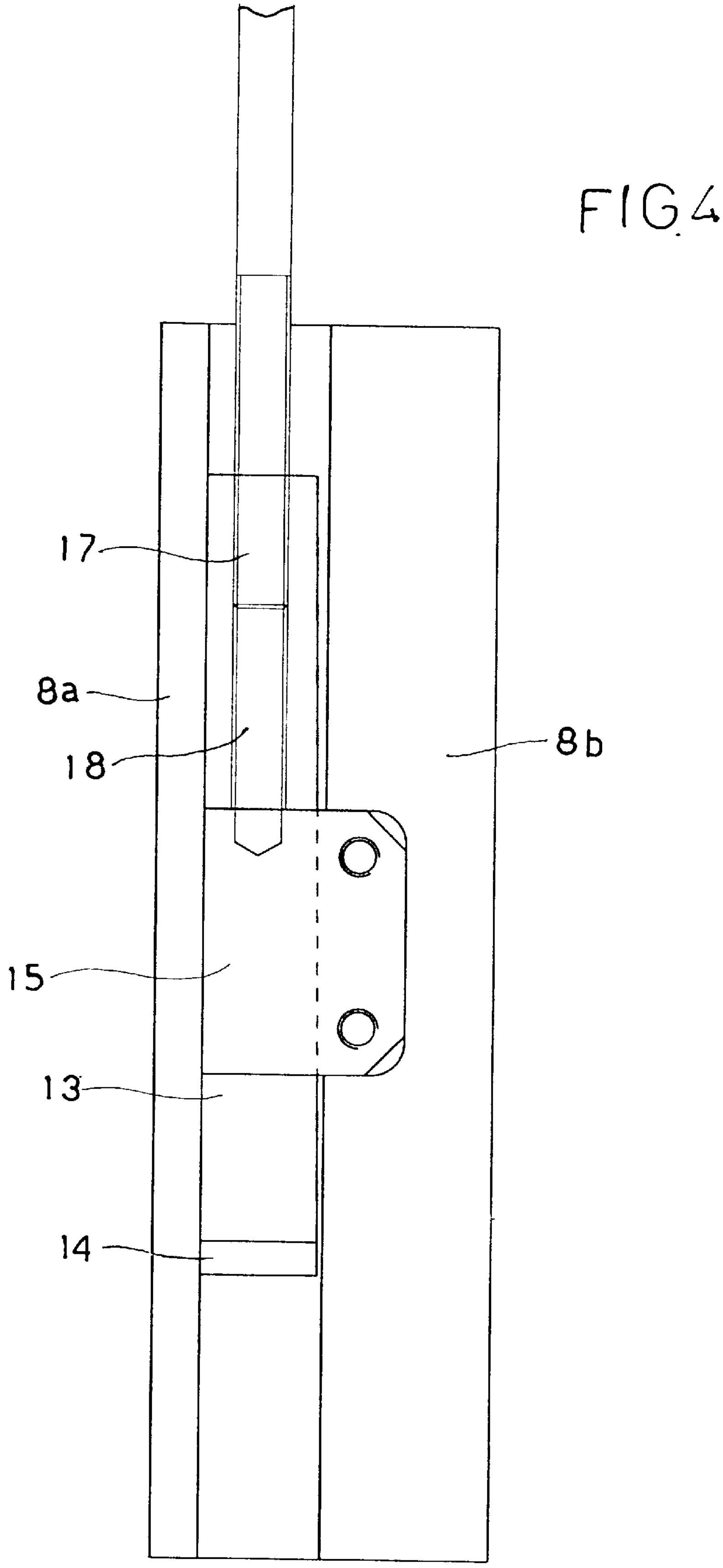
FIG. 4 shows an elevation view of a detail of the fixed counterblade.

This rotation, which allows the counterblade to be moved towards or away from the blade, is obtained by means of a wedge 13—shown more clearly in FIG. 4—which is housed in a seat 14 formed between a counterblock 15 and the arm **8*a*. The counterblock 15 is joined to the arm 8*b* by means of screws 16. The wedge 13 is made to slide in the seat 14 and then against the counterblock by means of an adjusting screw 17 which is inserted into a threaded hole 18** formed in the wedge itself.

Figure 2:
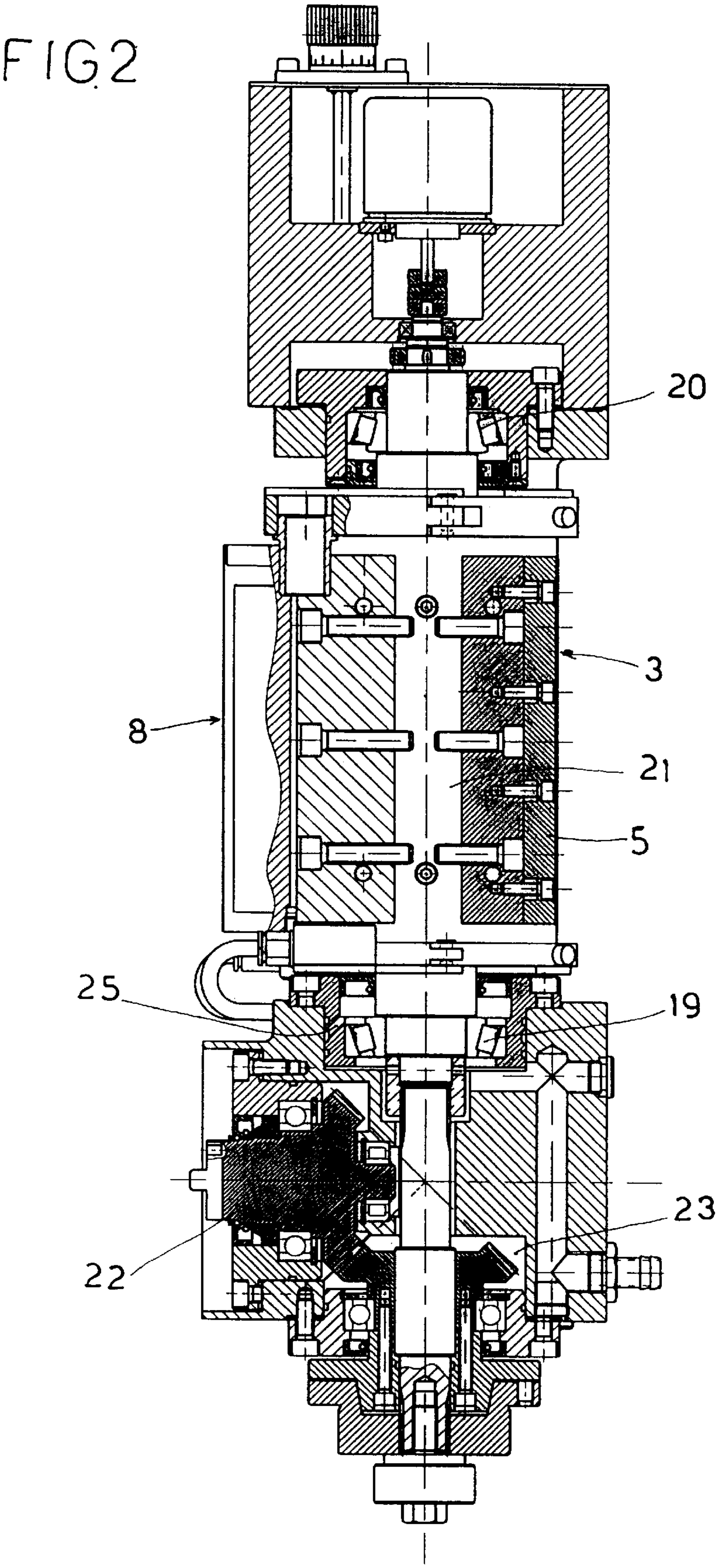
FIG. 2 shows a longitudinal section through the device along the line I—I of FIG. 1.
Figure 3:
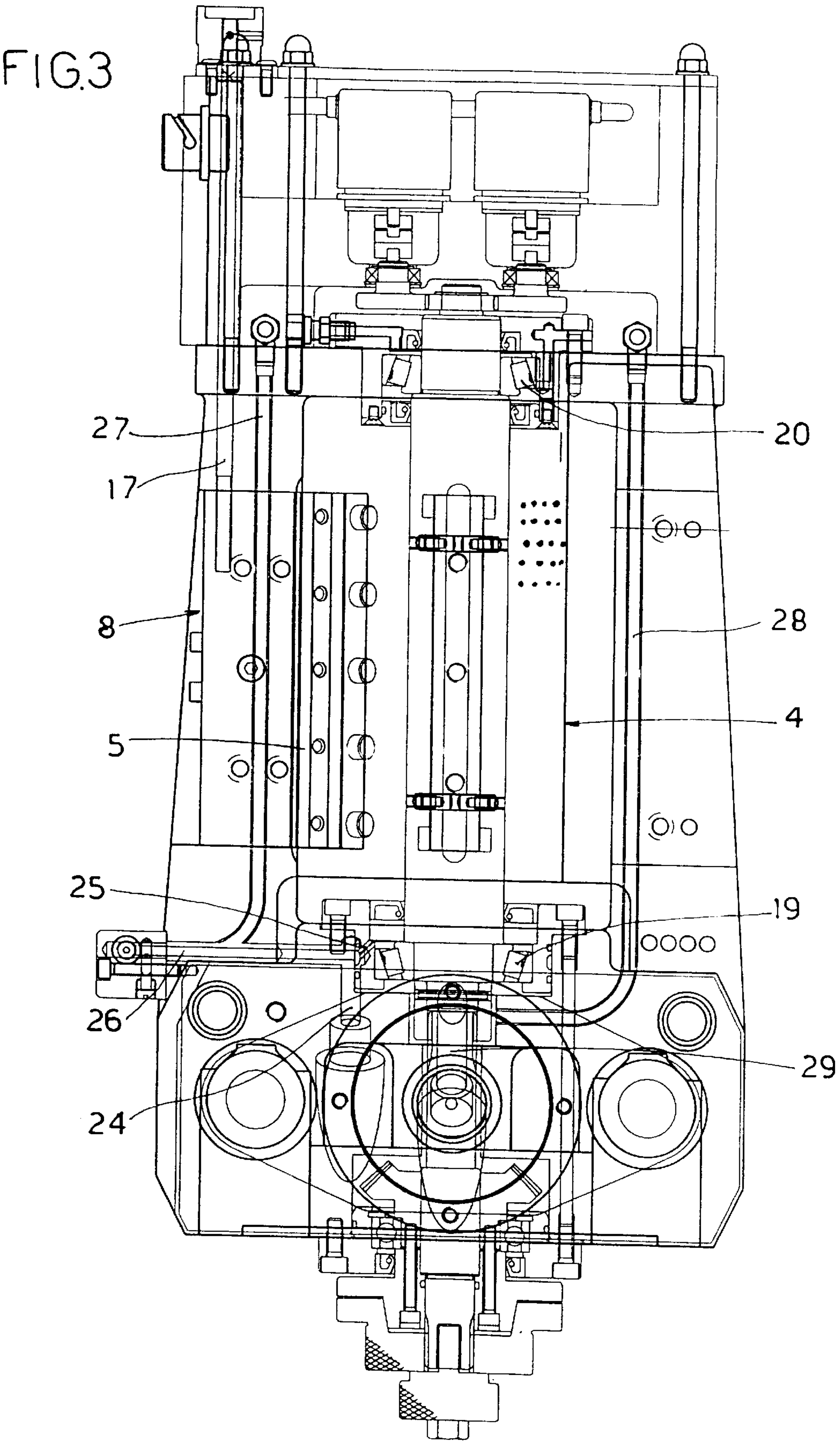
FIG. 3 shows a side view of the cutting group with the internal parts visible, sectioned along the line II—II of FIG. 1.

With particular reference to FIGS. 2 and 3, the rotating roller 4 is joined to a central shaft 21 supported by the frame by means of two bearings 19 and 20. The central shaft is driven by a bevel gear pair 22 housed in a chamber 23.

The bearings 19 and 20 and the bevel gear pair 22 are force-lubricated by means of oil heated to a temperature which is about 20 to 30° C. higher than the ambient temperature in which the labeling machine operates. For this purpose, the frame contains ducting which comprises: an inlet duct 24 which conveys the oil, via a channel 25, to the lower bearing 19 and, via a branch 26, to a duct 27 which rises as far as the upper bearing 20; a duct 28 extends from the bearing 20 and descends as far as the chamber 23 in which the bevel gear pair 22 is housed; the chamber 23 contains a discharge duct 29 which is connected to a temperature control unit not shown and of the known type.

The forced circulation of oil in the frame in which the ducting is formed, in the roller supports and in the drive group allows the entire metal mass of the rotating part of the cutting group to be stabilized at a predetermined temperature and kept constant so that, once the temperature condition has been reached, no deformations of the mechanical parts may occur due to expansion caused by temperature variations.

Once the temperature of the entire metal mass has been reached, it will be possible to adjust the position or distance of the counterblade with respect to the blade by means of rotation of the adjusting screw 17.

As can be seen more clearly in FIG. 1, the resilient support 8 allows the counterblade to be positioned at a point very close to the point of tangency, indicated by 30, between the circumference described by the blade and the circumference described by buffer pads 40 present on the gripping and transfer drum, this making it possible to reduce to a minimum the space in which the label remains free.

The position of the counterblade with respect to the point indicated by 30 is such that, in the case of labels for containers with a length of about 180 mm, at the moment of cutting, about two thirds of the label are already retained by gripping and transfer cylinder, longer labels the gripping condition is even better, namely the percentage portion of label retained increases with respect to the free portion which is unvaried at the moment of cutting.

32 denotes holes for forming a vacuum inside the roller so as to retain the label on the roller itself until it arrives in the vicinity of the point 30 where the vacuum is interrupted so as to allow the gripping drum, which is also under a vacuum, to take hold of the free edge of label. The holes 32 communicate with a plurality of apertures 33 formed on the side surface of the roller.

Figure 5:
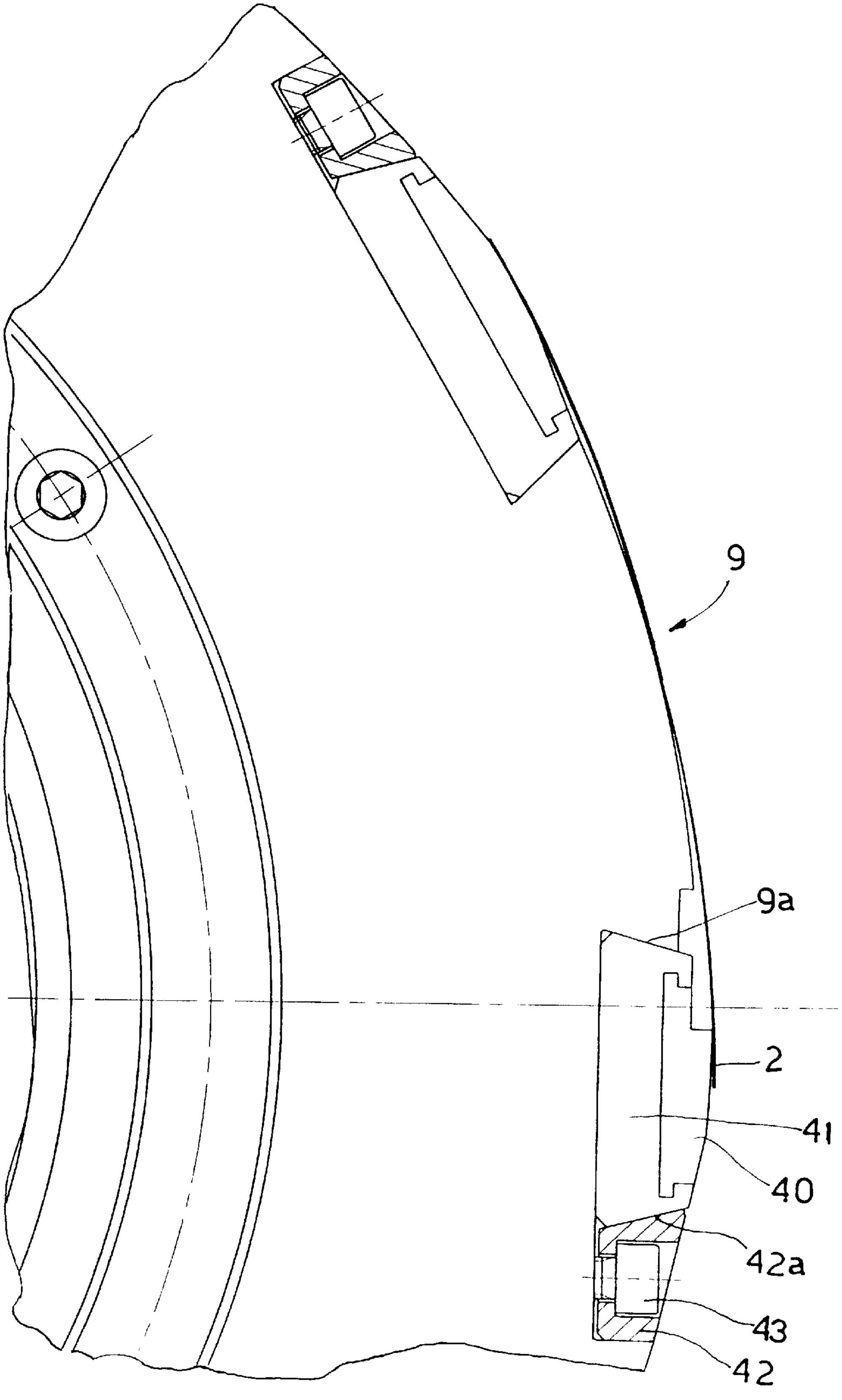
FIG. 5 shows a plan view of a detail of the system for fixing buffer pads onto the gripping and transfer drum.

As can be seen more clearly in FIG. 5, 40 denotes buffer pads projecting from the profile of the drum 9 and designed to convey the edges of the label against a gluing roller (not shown) so that a vertical strip of heated glue is deposited on said edges.

In order to facilitate replacement of the buffer pads, the latter are inserted onto dovetail supports 41 which are fixed to the drum by means of inserts 42 having an inclined wall 42*a* designed to form, with another wall 9*a* formed in the drum, a dovetail seat for retaining the support 41. The inserts 42 are screwed to the drum by means of hexagonal-head screws 43 which allow rapid replacement of the buffer pads themselves.

What is claimed:

1. A labeling device in a labeling machine with the continuous introduction of a film containing labels in reel form, comprising:

a cutting group having a blade located along a generatrix of a rotating roller and a counterblade, a gripping and transfer drum for gripping and transferring a label cut by said blade towards a device for applying glue in predetermined zones and subsequently onto a container, and a resilient support having a fork-shaped cross-section with two arms joined together in a portion which forms the point of rotation of the arm carrying said counterblade, and a wedge actuated by an adjusting screw to press against and cause rotation of the arm carrying said counterblade, said support for positioning said counterblade with respect to the point of tangency between the gripping and transfer drum and circumference described by said blade at a distance such that at least two thirds of the label are retained by said gripping and transfer drum at the moment of cutting of the label from the film by said blade.

2. The device as claimed in claim 1, wherein said rotating roller has ducting to receive oil preheated to a temperature 20–30° C. higher than the ambient temperature.

3. A labeling device in a labeling machine with the continuous introduction of a film containing labels in reel form, comprising:

a cutting group having a blade located alone a generatrix of a rotating roller and a counterblade, a gripping and transfer drum for gripping and transferring a label cut by said blade towards a device for applying glue in predetermined zones and subsequently onto a container, and said gripping and transfer drum having buffer pads inserted onto dovetail supports which are fixed to said gripping and transfer drum by inserts having an inclined wall designed to form with another wall in said gripping and transfer drum a dovetail seat for retaining the pads, and a support for positioning said counterblade with respect to the point of tangency between said gripping and transfer drum and circumference described by said blade at a distance such that at least two thirds of the label are retained by said gripping and transfer drum at the moment of cutting of the label itself from the film.

4. The device as claimed in claim 3, wherein said rotating roller has ducting to receive oil preheated to a temperature 20–30° C. higher than the ambient temperature.

* * * * *